United States Patent [19]

Block

[11] 4,220,456
[45] Sep. 2, 1980

[54] PAINT REMOVAL COMPOSITION SPRAY METHOD FOR PAINT BOOTHS

[75] Inventor: William V. Block, Apple Valley, Minn.

[73] Assignee: Fremont Industries, Inc., Shakopee, Minn.

[21] Appl. No.: 50,669

[22] Filed: Jun. 21, 1979

[51] Int. Cl.² .............................................. B01D 47/00
[52] U.S. Cl. .................................... 55/85; 98/115 SB
[58] Field of Search .................. 55/84, 85; 98/115 SB

[56] References Cited

U.S. PATENT DOCUMENTS

| 3,173,879 | 3/1965 | Arnold et al. | 98/115 SB |
| 4,055,404 | 10/1977 | Daimer | 55/85 |

Primary Examiner—Bernard Nozick
Attorney, Agent, or Firm—Orrin M. Haugen; Thomas J. Nikolai

[57] ABSTRACT

A method and formulation for separating airborne overspray mists of paint and lacquer from ambients which includes the steps of exposing the mist to an aqueous solution of a deactivating formulation, permitting the contact to continue until the paint has become deactivated, and thereafter separating the deactivated paint from the aqueous solution. The formulation which comprises the aqueous solution includes an alkaline agent consisting of calcium hydroxide, sodium metasilicate, and mixtures thereof, bentonite clay, an aliphatic petroleum distillate having a lower boiling point of greater than about 150° C., and a fatty acid nitrogen derivative selected from the group consisting of primary, tertiary, 1,3-propylenediamines, and quaternary ammonium chlorides, each with a fatty carbon chain length of from 10 to 18 carbon atoms. The formulations of the present invention are effective for deactivating and removing paint overspray of a variety of compositions, including both oil base and latex type paints, as well as epoxy and polyurethane base paints.

3 Claims, No Drawings

PAINT REMOVAL COMPOSITION SPRAY METHOD FOR PAINT BOOTHS

BACKGROUND OF THE INVENTION

The present invention relates generally to a method of treatment for the removal of paint and/or lacquer oversprays from ambients, specifically from wet paint spray booths or other similar paint applying stations. Generally, paint spray booths are designed to collect the overspray mist, with side draft booths and down draft booths being commonly employed. Typically, paint spray booths are disposed either laterally adjacent to or directly upon conveyorized production lines where metallic and non-metallic parts of various sizes and configurations are being painted prior to or following final assembly.

For example, a down draft paint booth consists of an enclosed paint spray area in which the overspray mist descends through floor grates into a water reservoir. A side-draft paint spray booth normally consists of an enclosure upon which a curtain of water is provided in which the overspray mist is collected and thereafter permitted to flow into a reservoir. Both types of booths employ a separation station wherein the deactivated overspray is removed through manual or automatic skimming devices and filters. The aqueous effluent is normally recirculated by fluid transfer pumps and re-used until the formulation has become exhausted. In manufacturing processes employed today, it will be appreciated that various types of paints, pigmentations, and film forming materials are utilized, and in a single establishment, a given paint spray booth may encounter up to 100 or more different types of paint.

In the present specification, the term "paint" is employed in a comprehensive sense, and is intended to refer to various oil base paints employing film forming resins of epoxy, polyester, or other air-drying films, as well as soya alkyd, acrylic, catalyzed polyurethanes, and polyesters. In addition, water base coatings may be effectively treated in the deactivation solutions, including acrylic latex, vinyl, acrylic latex, melamine-alkyd, styrenated alkyd copolymers and polyester base water-soluble dispersable coatings.

In conventional paint booth systems, as described above, conventional treatments normally permit the over-spray to remain partially live or at least tacky. When permitted to remain either partially live or tacky, excessive adherence and a build-up of film along the tank walls, baffles, lines, headers and nozzles leads to eventual clogging and fouling of the deactivation system. As can be appreciated, such clogging or fouling requires repeated, unscheduled, and unpredictable down-time and cleaning, with additional attention being directed to repair and possible replacement of certain spray booth components. Also, if the accumulated sludge is not removed promptly, it may ultimately assume a rock-hard consistency within the reservoir, thereby diminishing, and ultimately eliminating the capacity of the reservoir. When the sludge has hardened, the only effective means of removing the accumulation has been with jack-hammers, which requires a large expenditure of time, materials, and labor, with the down-time further contributing to operational expenses.

In other deactivation systems for paint booths, there is an overspray which settles as a live sludge on the bottom of the reservoir or tank, thereby rendering it difficult to handle. Any paint sludge which is not promptly deactivated tends to coalesce in time, thereby making its removal and clean-up a difficult task.

A further typical problem exists with multi-component treatments which are frequently employed for paint deactivation. Certain of these systems are controlled by monitoring the quantity of the formulation, including the monitoring of the pH which is often at a critical and sometimes troublesome level for accomplishing proper paint deactivation. Even though such treatments are designed to operate continuously and automatically, they frequently require close monitoring in order to ascertain that the system has not become deteriorated due to a coating of probes or other problems.

Depending upon the nature of the operation and the operator, the specific quantities of overspray mist generated from day to day can vary considerably. Such variances contribute to further problems of control. Therefore, it is difficult to pre-determine and calculate the concentrations, feed ratios, and other flow rates required to accommodate the existing or anticipated load of overspray mist. Since the quantity of overspray mist varies widely, consistent control has been a difficult problem to resolve. Frequently, if consistent control is not maintained, the paint overspray may remain live, and not deactivated, and thereafter dispersed rendering the overspray difficult to collect and separate. Such overspray tends to settle in the reservoir as a live sludge, thereby leading to certain of the problems defined herein.

Briefly, the formulations used in connection with the present invention contain a fatty acid nitrogen derivative selected from the group consisting of primary, tertiary, 1,3 propylenediamines, and quaternary ammonium chlorides. Each of these materials has a fatty carbon chain length of from 10 to 18 carbon atoms. When utilized, the primary fatty acid nitrogen derivative is represented by the structural formula $R_1-N-H_2$. When utilized, the tertiary fatty acid nitrogen derivatives are represented by the structural formulas:

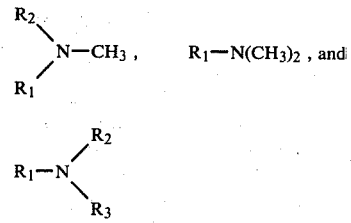

When utilized, the 1,3 propylenediamines are represented by the structural formula:

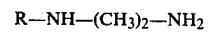

When utilized, the quaternary ammonium chlorides have the structural formula:

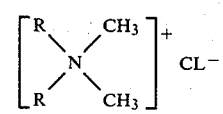

In each instance, $R_1$ represents a fatty acid chain of from 10 to 18 carbon atoms. The fatty acid nitrogen derivatives are present in the formulation in an amount ranging from between 1% and 10% by weight.

In addition to the fatty acid nitrogen derivatives, an alkaline agent consisting of calcium hydroxide, sodium metasilicate, or mixtures thereof is employed, along with bentonite clay and an aliphatic petroleum distillate having a lower boiling point of greater than about 150° C. In certain instances, sodium tripolyphosphate is added to condition the water and enhance the performance of the system.

As has been indicated, the aqueous solution is utilized for contact with the airborne overspray mist, with continued contact leading to a deactivation of the paint, and thereby permitting the deactivated paint to be separated from the aqueous solution. The aqueous solution may be re-used until it becomes exhausted.

Therefore, the formulations utilized in connection with the present invention offer an economical multifunctional treatment which operates effectively over a wide variety of paints, and also is effective within a relatively wide aqueous concentration range. The formulation is designed to effectively treat a variety of types of paints as indicated above, by floating and deactivating these paints to permit effective subsequent removal. By offering a formulation effective over a wide concentration range in aqueous solutions, feeding adjustments to accommodate variations in overspray load can be realistically avoided. Additionally, the formulations and methods offer an advantage of deactivating and floating much, if not all, the paint overspray, thereby permitting and facilitating simple removal from the booth. Overspray which does not settle and deactivate in the tank as sludge assumes a state with a generally powdery consistency. The accumulated sludge is deactivated to the extent that it does not harden or become brittle, thereby contributing to difficulty in removal. Generally, the overspray mist material which has been collected in the reservoirs are prevented from recombining through coalescence or other phenomenon, thereby further contributing to ease of removal. Proposed compositions of the type utilized in accordance with the present invention accordingly minimize the build-up of paint within the booth, and render the materials effective for floating—separations.

Therefore, it is the primary object of the present invention to provide an improved formulation and method for control of paint overspray in paint booths, wherein the formulation and method enhances the deactivation of the paint to the extent that separation of the deactivated paint is relatively easily accommodated.

As a further object of the present invention to provide an improved method and formulation for deactivation of airborne overspray of paint and lacquer mists from the ambients, which includes exposure of the paint overspray mist to an aqueous solution, and wherein continued contact of the overspray with the aqueous deactivates the paint to the extent that it may be easily separated from the aqueous portion of the moisture. Other and further objects of the present invention will become apparent to those skilled in the art upon a study of the following specification and appended claims.

DESCRIPTION OF THE PREFERRED EMBODIMENT

The following specific examples are given in order to permit those skilled in the art to comprehend the aspects of the present invention:

Example 1.

| Component | Percent |
| --- | --- |
| Hydrated lime (calcium hydroxide) | 37.5% |
| Clay | 37.5% |
| Sodium Metasilicate | 10% |
| Kemamine P 650D | 7% |
| White mineral seal oil | 5% |
| Deodorized kerosene | 3% |

With the exception of the latexes and the water borne polyester, this composition floated and rapidly deactivated the other paints evaluated. The deactivated paints remained floating and were easily skimmed from the paint booth. The deactivated paint was of a nontacky consistency. This composition contains no water conditioning agent such as sodium tripolyphosphate and its absence apparently had no bearing on the performance of the composition. The latex and polyester water borne coatings remained largely dispersed in solution and could not be skimmed as with the other paints.

EXAMPLE 2

| Component | Percent |
| --- | --- |
| Mineral Colloid 103 (Clay) | 37% |
| Hydrated Lime (calcium hydroxide) | 40% |
| Sodium Metasilicate | 10% |
| Sodium Tripolyphosphate | 5% |
| White Mineral Seal Oil | 5% |
| Deodorized Kerosene | 3% |

With the exception of the latexes and the polyester water borne coating, with certain deactivated paints tending to sink in the solution, thereby rendering it preferable to achieve early separation.

EXAMPLE 3

| Component | Percent |
| --- | --- |
| Sodium Metasilicate | 52% |
| Mineral Colloid 103 (Clay) | 30% |
| Kemamine P 650D | 5% |
| Sodium Tripolyphosphate | 5% |
| White Mineral Seal Oil | 5% |
| Deodorized Kerosene | 3% |

With the exception of the latexes and the polyester water borne coating, all of the other paints floated in the booth and were rapidly deactivated and easily skimmed from the booth. The latex paints and the polyester water borne coating assumed a very fine floc in suspension in the water wash which was not skimmable. This composition provided excellent results. Additional fatty nitrogen derivatives were evaluated in this composition at a level of 5% and consisted of a byproduct vegetable fatty acid nitrogen derivative, which is a primary amine derivative, byproduct vegetable fatty derivative of the 1,3 propylenediamine type; also a methyl di-coco tertiary fatty acid nitrogen derivative, a di-methyl hydrogenated tallow fatty acid nitrogen derivative, (tertiary) and finally a di-methyl tallow benzyl quaternary ammonium chloride fatty acid nitrogen derivative. These fatty acid nitrogen derivatives responded equally as well as the primary coco fatty acid nitrogen derivatives (KP 650D) and are representative of the various fatty nitrogen derivatives discussed above.

EXAMPLE 4

The formulation of the composition of example 1 was reproduced, with the exception that the alkaline agent consisted entirely of hydrated lime, 47½%.

EXAMPLE 5

The formulation of the composition of example 1 was reproduced, with the exception that the alkaline agent consisted entirely of hydrated lime, 42½%, and sodium metasilicate, 5%.

EXAMPLE 6

The formulation of the composition of example 1 was reproduced, with the exception that the alkaline agent consisted entirely of hydrated lime, 32½%, and sodium metasilicate, 15%.

EXAMPLE 7

The formulation of the composition of example 1 was reproduced, with the exception that the alkaline agent consisted entirely of sodium tripolyphosphate, 5% by weight was added, with this material functioning as a water conditioner in the overall formulation. Superior results were achieved for certain paint formulations.

DESCRIPTION OF COMPONENTS

A typical working solution includes the components set forth above in a concentration ranging from 1/16 to 2 oz. per gallon. Within this range, the formulations were found to be effective. Typical treatment includes exposure of the paint overspray mist to the working solutions for a period of up to about 5 minutes at room temperature.

Hydrated lime, normally referred to as slacked lime is, of course, chemically equivalent to calcium hydroxide. Hydrated lime is commercially available from a large variety of sources.

The other alkaline agent is sodium metasilicate, and is available from a wide variety of sources including Philadelphia Quartz Co. of Philadelphia, Pa. and Diamond-Shamrock Co. of Chicago, Ill.

The high boiling petroleum distillate may be selected and available commercially as white mineral seal oil and deodorized kerosene. Typically, these materials have a lower boiling point of about 0.150° C.

Bentonite clay, a colloidal clay is available commercially. The fatty acid nitrogen derivatives are also widely available commercially.

Hydrated Lime

Hydrated lime is employed to avoid saponification of the fatty acid nitrogen derivatives employed in the present materials, and thus eliminates foaming during use. Hydrated lime (calcium hydroxide) is preferred over potassium or sodium hydroxide because of its inability to generate a water-soluable soap which could otherwise be formed when exposed to certain paint formulations. Also, the hydrated lime is readily dispersable in aqueous solutions of up to % concentration, and thus effectively serves as an alkaline agent. The hydrated lime further generates an in-situ defoamer through reaction of the calcium hydroxide with the fatty acid moiety of the fatty acid nitrogen derivatives. The hydrated lime provides a relatively high pH for the system, with certain paints responding favorably and effectively to solutions of high pH, that is, a pH greater than about 10.

Bentonite Clay

Bentonite clay has been utilized in the past in treating paint overspray mists, and is desirable in that it readily disperses in water due to its high surface area and its swelling tendencies in water. It normally attracts active (live) paint bodies and aids in the prevention of the coalescing of the overspray mists in the paint spray booths. Bentonite clays have a neutral pH and therefore do not detract from the alkaline pH desired. Bentonite clays tend to dry or convert the overspray to a more earthy consistency which has a lesser degree of tack. A synergistic effect is established between the bentonite clay and the fatty acid nitrogen derivatives in that the overspray mass tends to float longer, and is more readily deactivated and hence easier to skim from the booth when floating on the aqueous solution.

Sodium Metasilicate

This material functions as an alkaline agent in combination with the hydrated lime, with sodium metasilicate having been relatively widely used and employed in prior art paint booth ovespray treatment. One primary function of sodium metasilicate is to inhibit corrosion within the booth, and further serving as a buffer for alkalinity in the treatment system. Sodium metasilicate may be employed as a replacement for the entire alkaline agent to the exclusion of the hydrated lime.

Fatty Acid Nitrogen Derivatives

These materials are a key component in the overall formulations, having been proven effective in deactivating paint sprays when employed in aqueous solutions. These materials contribute to the formation of a film in the bath or booth which serves to attract the overspray mist which then floats upon the aqueous solution and is converted to a deactivated floating mass. The fatty acid nitrogen derivatives synergistically function with the colloidal material, and also to a certain extent with the hydrated lime (calcium hydroxide) with the generation or formation of a component which functions as an effective surface tension increaser or defoamer. Fatty acid nitrogen derivatives are stable in the high alkaline systems, and are stable in solutions with a pH as high as 12. These fatty acid nitrogen derivatives are normally cationic in nature, and are selected from fatty carbon chain lengths varying from 10 to 18 carbon atoms, and including primary, tertiary, 1,3 propylene diamines, and quaternary ammonium chlorides. Typically of the primary fatty acid nitrogen amines are coco, oleo, soya and vegetable oils with melting point ranges of from 50° to 75° F., and with a pour point range of between 5° and 80° F. These materials are represented by the structural formula:

wherein R represents a fatty carbon chain having from between 10 and 18 carbon atoms.

The tertiary fatty acid amines are represented by the following structural formulas:

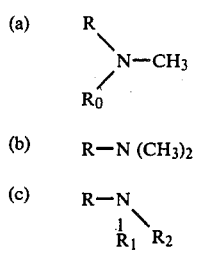

wherein R represents a fatty carbon chain length having from between 10 and 18 carbon atoms.

Typical of the fatty 1,3 propylene diamine types are the N-coco and N-byproduct vegetable oils with a melting point of approximately 70° F. and a pour point range of from between about 30° F. and 70° F. These are typically represented by the following structural formula:

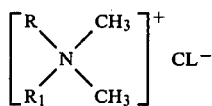

wherein R represents a fatty carbon chain having a length of between 10 and 18 carbon atoms.

In connection with the tertiary fatty acid amines, such fatty amines include methyl di-coco oil having a pour point of about 34° F., dimethyl-coco oil having a melting point range from between 5° and 8° F., with a pour point of 5° F., dimethyl hydrogenated tallow with a melting point of between about 65° F. and 68° F., and with a pour point of about 60° F.; dimethyl tallow with a pour point of about 46° F., and dimethyl stearyl with a melting point range from between about 68° F. and 73° F. with a pour point of about 65° F.; and bis-(2-hydroxy ethyl) coco-amine; bis-(2-hydroxy ethyl) soya-amine; bis-(2-hydroxy ethyl) oleylamine; bis-(2-hydroxy ethyl) tallow-amine; and bis-(2-hydroxy ethyl) stearyl-amine.

In addition, the fatty tertiary amines described above may contain from 0 to 5 poly-oxy-ethylene groups attached to the nitrogen. Increasing the number of the poly-oxy-ethylene groups beyond the number mentioned above renders the fatty acid nitrogen derivatives more non-ionic in nature rather than cationic and the derivatives become higher foaming.

The quaternary ammonium chloride fatty derivatives consist of dimethyl di-coco (pour point 23° F.), di-methyl di-hydrogenated tallow (pour point 72° F.), di-methyl hydrogenated tallow benzyl (pour point 70° F.) and di-methyl tallow benzyl (pour point 34° F.). These compounds are represented by the generic formula:

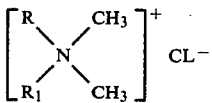

wherein R represents a fatty carbon chain having a length of between 10 and 18 carbon atoms.

For ease of manufacture, fatty acid nitrogen derivatives are preferably liquids at room temperatures, with solids being somewhat more difficult to manufacture, treat and handle. These fatty acid nitrogen derivatives may also serve to minimize paint build-up in paint booths by keeping the overspray mist relatively loose and non-adherent to adjoining surfaces.

Aliphatic Petroleum Distillate

This material is normally obtained as white mineral seal oil or deodorized kerosene, and function as dispersants-wetters for the fatty acid nitrogen derivatives, and also for assisting in formulation of the products as they are mixed and added to the various powder constituents. The applications of these materials as defoamers is known and widely recognized, with these materials also functioning as de-dusting agents for the compounded products. Unlike those defoamers employed in presently available paint deactivators, the defoamers used in this application are of low-odor, generally non-aromatic and without a silicone content. They normally present minimal problems of disposal as most of these materials are either directly consumed or otherwise chemically reacted with the paint solids which eventually are removed by skimming.

General Comments

The formulations as set forth herein are generally off-white powders mixed with the petroleum distillates. Solutions of the materials present little, if any, disposal problems, particularly after removal of the deactivated paint solids. Solution concentration control is relatively easily maintained by simple titration with an appropriate additions of concentrate when indicated.

In a typical solution, the concentration in pH's are generally as follows:

| pH | Ounces per Gallon |
| --- | --- |
| 10.9 | ⅛ ounce |
| 11.5 | ¼ ounce |
| 11.9 | ½ ounce |
| 12.1 | 1.0 ounce |

Generally, concentration range for the working solution is between 1/16th and 2 ounces per gallon, with the most desirable concentration range being between about ⅛th ounce to about ½ ounce per gallon. The use of such composition allows removal of the solids from the paint booth by skimming procedures since the deactivated overspray tends to float on the surface of the reservoir and thus rapidly assumes a deactivated and separable state. Sludge material which may remain and which is not settled through skimming may be removed through filtering, since this material remains relatively manageable in terms of its lack of hardness and lack of tack. Periodic scooping, shoveling, or filtration may be employed. Typically, the material which separates through sinking may be removed by draining the tank and hosing out the tank with water and thereafter recharging the system with fresh water and the deactivating formulation.

Cationic Formulations

As has been indicated, the formulations tend to be cationic in nature and thus have proven to be more effective for handling certain paints which are recognized as being difficult to treat, including the acrylics, the vinyls, and catalyzed polyurethanes.

Test Procedure

With the examples given hereinabove, tests were conducted with a 90-gallon capacity side-draft paint booth constructed of steel, and utilizing a 1-hp recirculatory pump with a capacity of 30 gallons per minute. The booth was charged with concentrations of the examples ranging from 1/16th to 2 ounces per gallon. During running of the booth, various paints were introduced by either spraying or trickling on the water curtain.

I claim:

1. The method of separating airborne overspray mists of paint from ambience which includes the steps of:
   (a) providing a flow of an aqueous solution of a deactivator formulation comprising:

| Component | Percent Range by Weight |
|---|---|
| (1) A fatty acid nitrogen derivative selected from the group consisting of a primary, tertiary, 1,3-propylene diamine, and quaternary ammonium chlorides; each with a fatty carbon chain length of from 10 to 18 carbon atoms, and wherein: | |
| (i) the primary fatty acid nitrogen derivative is represented by the structural formula: $R_1-N-H_2$ | |
| (ii) the tertiary fatty acid nitrogen derivatives are represented by the structural formula:  $R_1-N(CH_3)_2$ and 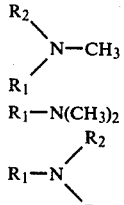 | |
| (iii) the 1,3-propylene diamines are represented by the structural formula: 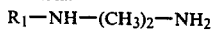 | |
| (iv) the quaternary ammonium chlorides fatty acid derivatives are represented by the structural formula: $$\begin{bmatrix} R & CH_3 \\ & N & \\ R & CH_3 \end{bmatrix}^+ CL^-$$ with R representing a fatty acid carbon chain length of from 10 to 18 carbon atoms, and wherein $R_2$ represents an alkyl group of from 1 to 3 carbon atoms; | 1 to 10 |
| (2) an alkyline agent selected from the group consisting of calcium hydroxide, sodium metasilicate, and mixtures thereof; | 10 to 50 |
| (3) bentonite clay; and | 10 to 50 |
| (4) an aliphatic petroleum distillate having a lower boiling point of greater than about 150° C. | 1 to 10 |

(b) permitting the spray to remain in contact with the aqueous solution until the paint has become deactivated, and thereafter separating the deactivated paint from the aqueous solution.

2. The method as defined in claim 1 being particularly characterized in that said aqueous solution contains up to about 5% of sodium tripolyphosphate.

3. The method as defined in claim 1 being particularly characterized in that said formulation comprises:

| Component | Percent by Weight |
|---|---|
| (1) A fatty acid nitrogen derivative selected from the group consisting of a primary, tertiary, 1,3-propylene diamine, and quaternary ammonium chlorides; each with a fatty carbon chain length of from 10 to 18 carbon atoms; | 7% |
| (2) calcium hydroxide; | 37.5% |
| (3) sodium metasilicate; | 10% |
| (4) bentonite clay; | 37.5% |
| (5) petroleum distillate (white mineral seal oil); and | 5% |
| (6) deodorized kerosene | 3% |

* * * * *